United States Patent
Kikawada et al.

(10) Patent No.: US 11,387,992 B2
(45) Date of Patent: Jul. 12, 2022

(54) TRANSMITTING DEVICE, RECEIVING DEVICE, AND QUANTUM KEY DISTRIBUTION SYSTEM

(71) Applicants: Kabushiki Kaisha Toshiba, Minato-ku (JP); TOSHIBA INFRASTRUCTURE SYSTEMS & SOLUTIONS CORPORATION, Kawasaki (JP)

(72) Inventors: Masakazu Kikawada, Yokohama (JP); Masatoshi Hirono, Yokohama (JP)

(73) Assignees: Kabushiki Kaisha Toshiba, Minato-ku (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 821 days.

(21) Appl. No.: 16/239,576

(22) Filed: Jan. 4, 2019

(65) Prior Publication Data
US 2019/0222415 A1    Jul. 18, 2019

(30) Foreign Application Priority Data
Jan. 18, 2018    (JP) .............................. JP2018-006278

(51) Int. Cl.
*H04B 10/00*    (2013.01)
*H04L 9/08*    (2006.01)
(Continued)

(52) U.S. Cl.
CPC ........... *H04L 9/0858* (2013.01); *G06N 10/00* (2019.01); *H04B 10/70* (2013.01)

(58) Field of Classification Search
CPC .................................................... H04B 10/70
See application file for complete search history.

(56) References Cited

U.S. PATENT DOCUMENTS

2005/0135627 A1    6/2005 Zavriyev et al.
2006/0153573 A1*   7/2006 Tomaru ................. H04L 9/0858
                                                                   398/152
(Continued)

FOREIGN PATENT DOCUMENTS

JP    2007-251678    9/2007
JP    4528783        8/2010
JP    4619578        1/2011

OTHER PUBLICATIONS

Chen, J. et al., "Stable quantum key distribution with active polarization control based on time-division multiplexing", New Journal of Physics, vol. 11, 2009, 13 pages.

*Primary Examiner* — Daniel G Dobson
(74) *Attorney, Agent, or Firm* — Oblon, McClelland, Maier & Neustadt, L.L.P.

(57) ABSTRACT

According to one embodiment, a transmitting device for a quantum key distribution system includes a light source, a beam splitter, an encoder, and a beam combiner. The light source is configured to generate an optical pulse. The beam splitter is configured to split the optical pulse into a signal pulse that travels through a first path and a polarization control pulse that travels through a second path, the second path being different in an optical path length from the first path. The encoder is provided at the first path and is configured to encode information with respect to the signal pulse. The beam combiner is configured to combine the signal pulse passing through the encoder and the polarization control pulse.

6 Claims, 3 Drawing Sheets

(51) Int. Cl.
*G06N 10/00* (2022.01)
*H04B 10/70* (2013.01)
*H04J 14/00* (2006.01)

(56) References Cited

U.S. PATENT DOCUMENTS

2006/0290941 A1 12/2006 Kesler et al.
2007/0248229 A1 10/2007 Kawamoto et al.
2016/0072586 A1* 3/2016 Hochberg .............. H04B 10/64
398/136

\* cited by examiner

TRANSMITTING DEVICE, RECEIVING DEVICE, AND QUANTUM KEY DISTRIBUTION SYSTEM

CROSS-REFERENCE TO RELATED APPLICATIONS

This application is based upon and claims the benefit of priority from Japanese Patent Application No. 2018-006278, filed Jan. 18, 2018, the entire contents of which are incorporated herein by reference.

FIELD

Embodiments described herein relate generally to a quantum key distribution system.

BACKGROUND

A quantum key distribution system includes a transmitter, a receiver, a quantum transmission path that connects the transmitter and the receiver. The transmitter transmits photons to the receiver via the quantum transmission path. Thereafter, the transmitter and the receiver mutually confirm signal information, so that they share an encryption key. This technique is generally called quantum key distribution (QKD). According to the basic principles of quantum mechanics, photons are changed in a physical state if they are measured by an eavesdropper in the quantum transmission path. This causes an error between a signal transmitted by the transmitter and a signal received by the receiver. QKD makes it possible to detect the presence of an eavesdropper on the quantum transmission path by comparing common parts of signals.

For QKD to work, it is desirable that the states of photons do not change throughout the quantum transmission path. However, photons are changed in both a polarization state and a phase state due to, e.g., a temperature change or vibration in the quantum transmission path. The quantum key distribution system includes a feedback mechanism that corrects the polarization disturbance and phase disturbance described above.

DETAILED DESCRIPTION

According to one embodiment, a transmitting device for a quantum key distribution system includes a light source, a beam splitter, an encoder, and a beam combiner. The light source is configured to generate an optical pulse. The beam splitter is configured to split the optical pulse into a signal pulse that travels through a first path and a polarization control pulse that travels through a second path, the second path being different in an optical path length from the first path. The encoder is provided at the first path and is configured to encode information with respect to the signal pulse. The first beam combiner is configured to combine the signal pulse passing through the encoder and the polarization control pulse.

Hereinafter, embodiments will be described with reference to the accompanying drawings.

Figure 1:
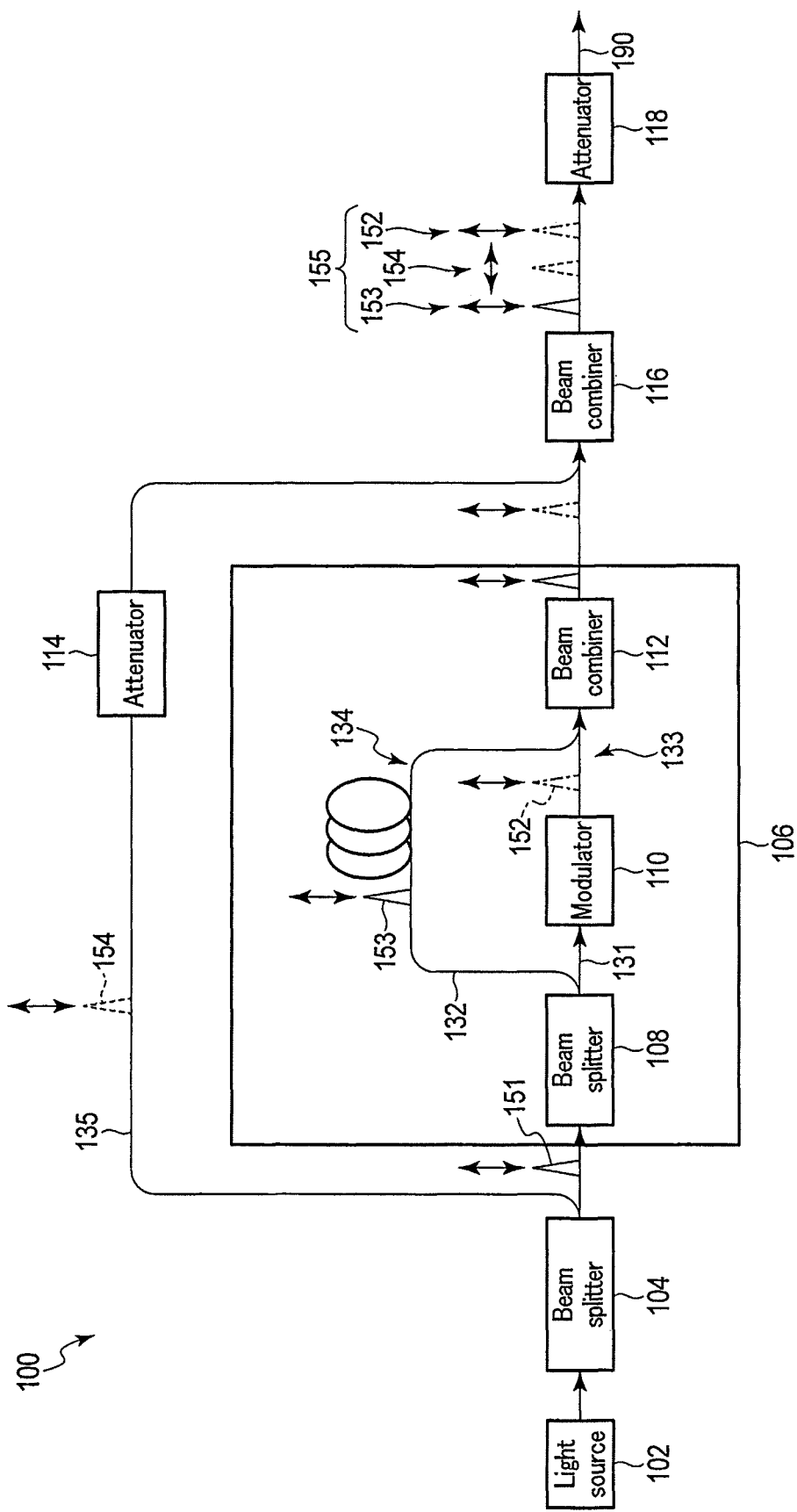
FIG. 1 is a diagram illustrating a transmitter for a quantum key distribution system according to one embodiment.
Figure 2:
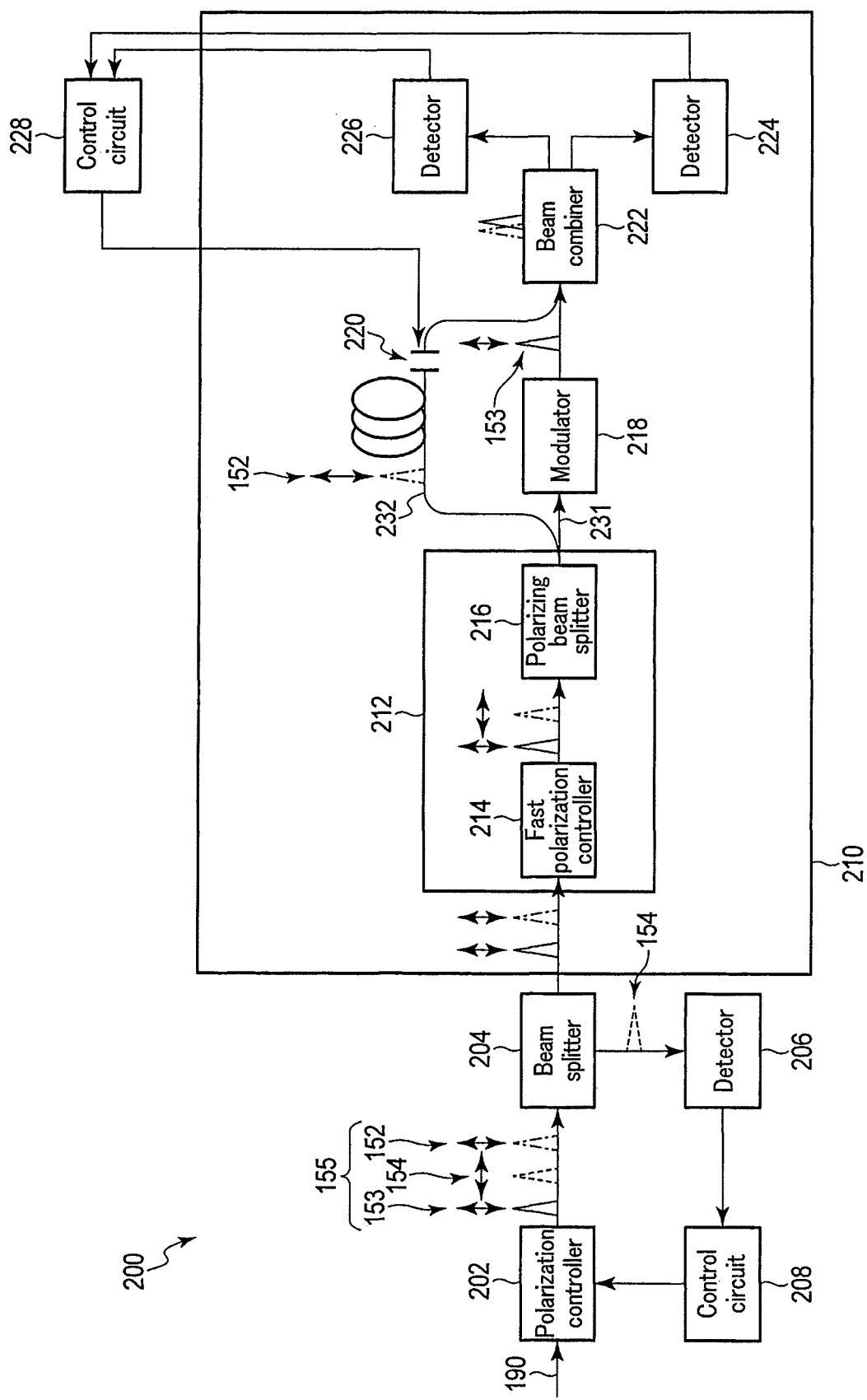
FIG. 2 is a diagram illustrating a receiver for a quantum key distribution system according to one embodiment.

FIG. 1 and FIG. 2 illustrate a transmitter (transmitting device) 100 and a receiver (receiving device) 200 for a quantum key distribution system according to one embodiment, respectively. The transmitter 100 is coupled to the receiver 200 via a transmission path 190. The transmission path 190 is an optical fiber such as a single-mode fiber. The transmitter 100 and the receiver 200 are synchronized with each other. For example, the quantum key distribution system may include a timing controller (not shown) that generates a synchronization signal for synchronizing the transmitter 100 with the receiver 200. As one example, the timing controller is provided in the receiver 200, and synchronization signals are transmitted to the transmitter 100 via a classical channel.

As in FIG. 1, the transmitter 100 includes a light source 102, a beam splitter 104, an interferometer 106, an attenuator 114, a beam combiner 116, and an attenuator 118. The light source 102 is coupled to an input port of the beam splitter 104. A first output port of the beam splitter 104 is coupled to a first input port of the beam combiner 116 through the interferometer 106. A second output port of the beam splitter 104 is coupled to a second input port of the beam combiner 116 through the attenuator 114. The interferometer 106 includes a beam splitter 108, a modulator 110, and a beam combiner 112. In the interferometer 106, an input port of the beam splitter 108 is coupled to the first output port of the beam splitter 104. A first output port of the beam splitter 108 is coupled to a first input port of the beam combiner 112 through the modulator 110. A second output port of the beam splitter 108 is coupled to a second input port of the beam combiner 112. An output port of the beam combiner 112 is coupled to the first input port of the beam combiner 116. All of the optical fibers that connect the components (for example, the light source 102 and the beam splitter 104) including the light source 102 to the beam combiner 116 may be polarization-maintaining fibers. An output port of the beam combiner 116 is coupled to the transmission path 190 through the attenuator 118. An optical fiber that connects the beam combiner 116 and the attenuator 118 is, for example, a single-mode fiber.

The light source 102 generates optical pulses. In the present embodiment, the light source 102 generates linearly-polarized optical pulses. The light source 102 may be a laser diode, but is not limited thereto. The light source 102 is driven by a trigger signal that is applied by a control circuit (not shown). A trigger signal is, for example, a voltage signal having a predetermined frequency (e.g., 1 GHz). With this trigger signal, the light source 102 generates an optical pulse at regular intervals (e.g., at nanosecond intervals). The light source 102 outputs an optical pulse such that a polarization direction of the optical pulse is in parallel with a specific axis (typically, a slow axis) of a polarization-maintaining fiber.

The beam splitter 104 splits an optical pulse output from the light source 102 into two parts. The first part of the optical pulse, which is output from the first output port of the beam splitter 104, is used to generate an encryption key, and is referred to as a "signal pulse" 151. The second part of the optical pulse, which is output from the second output port of the beam splitter 104, is used to correct polarization disturbance caused in a signal pulse in transmission, and is referred to as a "polarization control pulse" 154.

The beam splitter 104 may be a fiber coupler, but is not limited thereto. It is desirable that the branching ratio of the beam splitter 104 be set in a manner such that the polarization control pulse 154 is higher in intensity than the signal pulse 151. The beam splitter 104 having the branching ratio set in this way causes the increased number of photons which the polarization control pulse 154 includes when it is output from the transmitter 100. The branching ratio may be set to 1:1 (that is, set in a manner such that the polarization control pulse 154 is equal in intensity to the signal pulse 151), and may be set in a manner such that the polarization control pulse 154 is lower in intensity than the signal pulse 151.

The interferometer 106 corresponds to an encoder that receives the signal pulse 151 from the beam splitter 104 and encodes information onto the signal pulse 151. Herein, the information is to be transmitted to the receiver 200 in order to generate an encryption key to be shared between the transmitter 100 and the receiver 200. The interferometer 106 is an asymmetric Mach-Zehnder interferometer.

In the interferometer 106, the signal pulse 151 enters the beam splitter 108. The beam splitter 108 splits the signal pulse 151 into two pulses, i.e., a signal pulse 152 and a signal pulse 153. The beam splitter 108 may be a fiber coupler, but is not limited thereto.

The signal pulse 152 that has been output from the first output port of the beam splitter 108 enters the modulator 110. The modulator 110 modulates a phase of the signal pulse 152 based on information to be transmitted. The signal pulse 152 that has passed through the modulator 110 enters the beam combiner 112. The signal pulse 153 that has been output from the second output port of the beam splitter 108 enters the beam combiner 112. The beam combiner 112 combines the signal pulse 153 and the signal pulse 152 that has passed through the modulator 110. The beam combiner 112 may be a fiber coupler, but is not limited thereto. The signal pulses 152 and 153 that have passed through the interferometer 106 enter the beam combiner 116.

The signal pulse 152 and the signal pulse 153 travel along a path 131 and a path 132, respectively, from the beam splitter 108 to the beam combiner 112, in which the path 132 is longer in optical path length than the path 131. A difference in optical path length between the path 131 and the path 132 corresponds to a light propagation delay time $t_{delay}$. That is, at an exit of the interferometer 106, the signal pulse 153 is delayed by time $t_{delay}$ as compared with the signal pulse 152.

A slow axis of polarization-maintaining fibers that are coupled to the first input port and the second input port of the beam combiner 112 are aligned in the same direction. Accordingly, at the exit of the interferometer 106, polarization of the signal pulse 152 becomes identical to polarization of the signal pulse 153.

The polarization control pulse 154 that has been output from the beam splitter 104 enters the attenuator 114. The attenuator 114 attenuates the intensity of the polarization control pulse 154. The polarization control pulse 154 that has passed through the attenuator 114 enters the beam combiner 116.

The beam combiner 116 combines the signal pulses 152 and 153 and the polarization control pulse 154, thereby generating an optical pulse train 155. The beam combiner 116 may be a polarizing beam splitter, but is not limited thereto. The polarization control pulse 154 travels along a path 135 from the beam splitter 104 to the beam combiner 116. This path 135 is longer in optical path length than a path 133 including the path 131 from the beam splitter 104 to the beam combiner 116, and is shorter in optical path length than a path 134 including the path 132 from the beam splitter 104 to the beam combiner 116. Therefore, at the exit of the beam combiner 116, the polarization control pulse 154 is present between the signal pulse 152 and the signal pulse 153. In the case where a difference in optical path length between the path 133 and the path 135 is equal to a difference in optical path length between the path 135 and the path 134, the polarization control pulse 154 is positioned in the middle between the signal pulse 152 and the signal pulse 153.

A slow axis of the polarization maintaining fiber coupled to the first input port of the beam combiner 116 is rotated by 90 degrees with respect to a slow axis of the polarization maintaining fiber coupled to the second input port of the beam combiner 116. By this rotation, polarization of the polarization control pulse 154 becomes perpendicular to polarization of the signal pulses 152 and 153. This prevents or restrains the polarization control pulse 154 from interfering with the signal pulses 152 and 153.

The optical pulse train 155 that has been output from the beam combiner 116 enters the attenuator 118. The attenuator 118 attenuates the optical pulse train 155 such that the intensity of the signal pulses 152 and 153 exhibits a single photon level. Specifically, the attenuator 118 attenuates the optical pulse train 155 such that the average number of photons per pulse of each of the signal pulses 152 and 153 drops to less than one. When the average number of photons per pulse of each of the attenuated signal pulses 152 and 153 is defined as $\mu_1$, the expression of $\mu_1 < 1$ is established. For example, $\mu_1 = 0.5$. The polarization control pulse 154 is also attenuated by the attenuator 118. However, the control pulse 154 is higher in intensity than the signal pulses 152 and 153. Thus, when the average number of photons per pulse of the attenuated signal pulse 154 is defined as $\mu_2$, the expression of $\mu_2 > \mu_1$ is established. In the present embodiment, the polarization control pulse 154 maintains a multi-photon state even after passing through the attenuator 118. For example, $\mu_2 = 10$. The optical pulse train 155 that has passed through the attenuator 118 is transmitted to the receiver 200 through the transmission path 190.

The attenuator 118 may be provided elsewhere, for example, between the beam splitter 104 and the beam splitter 108, or between the beam combiner 112 and the beam combiner 116. In addition, the attenuator 114 is not always necessary.

As shown in FIG. 2, the receiver 200 includes a polarization controller 202, a beam splitter 204, a detector 206, a control circuit 208, an interferometer 210, and a control circuit 228. The transmission path 190 is coupled to an input port of the polarization controller 202. An output port of the polarization controller 202 is coupled to an input port of the beam splitter 204. A first output port of the beam splitter 204 is coupled to the detector 206. A second output port of the beam splitter 204 is coupled to the interferometer 210. The interferometer 210 includes an optical switch 212, a modulator 218, a variable delay line 220, a beam combiner 222, a detector 224, and a detector 226. In the interferometer 210, the second output port of the beam splitter 204 is coupled to an input port of the optical switch 212. A first output port of the optical switch 212 is coupled to a first input port of the beam combiner 222 through the modulator 218. A second output of the optical switch 212 is coupled to a second input port of the beam combiner 222 through the delay line 220. All of the optical fibers that connect the components (for example, the polarization controller 202 and the beam splitter 104) including the polarization controller 202 to the beam combiner 222 may be polarization-maintaining fibers. A first output port of the beam combiner 222 is coupled to the detector 224. A second output port of the beam combiner 222 is coupled to the detector 226. An optical fiber that connects the beam combiner 222 and the detector 224, an optical fiber that connects the beam combiner 222 and the detector 226, and an optical fiber that connects the beam splitter 204 and the detector 206 are, for example, single-mode fibers.

The receiver 200 receives the optical pulse train 155 that has been output from the transmitter 100. In the receiver 200, the optical pulse train 155 enters the polarization controller 202. As described above, the optical train 155 includes the signal pulses 152 and 153 as well as the polarization control pulse 154 between the signal pulses 152 and 153. The polarization controller 202 controls a polarization state of an incident light. The polarization controller 202 changes a polarization state of an incident light to a discretionary polarization state by applying a stress to an optical fiber. The polarization controller 202 controls polarization of the optical pulse train 155. The polarization controller 202 is adjusted by the control circuit 208 such that the polarization control pulse 154 has predetermined polarization at the time of entering the beam splitter 204. The optical pulse train 155 that has passed through the polarization controller 202 enters the beam splitter 204.

The beam splitter 204 splits the optical pulse train 155 into the pair of signal pulses 152 and 153, and the polarization control pulse 154. The beam splitter 204 includes an optical element that extracts a light component having predetermined polarization from the polarization control pulse 154. The beam splitter 204 may be a polarizing beam splitter, but is not limited thereto. The detector 206 detects light that the beam splitter 204 extracts from the polarization control pulse 154. In the present embodiment, the detector 206 measures the intensity of incident light, and outputs a detection signal indicative of the measured light intensity to the control circuit 208. The control circuit 208 controls the polarization controller 202 based on a detection signal received from the detector 206 such that the polarization control pulse 154 that enters the beam splitter 204 has predetermined polarization. The control circuit 208 is realized by a dedicated hardware processor such as a field programmable gate array (FPGA). The control circuit 208 may be realized by a general hardware processor such as a central processing unit (CPU).

In the present embodiment, the beam splitter 204 is a polarizing beam splitter, in which light having predetermined polarization is output from the first output port, while light having polarization perpendicular to the predetermined polarization is output from the second output port. Ideally, the polarization control pulse 154 has polarization identical to the predetermined polarization, and the entire polarization control pulse 154 is detected by the detector 206. If disturbance occurs in polarization of the polarization control pulse 154, part of the polarization control pulse 154 enters the interferometer 210 or is lost at the beam splitter 204, thereby decreasing the intensity of the polarization control pulse 154 that is measured by the detector 206. The control circuit 208 adjusts the polarization controller 202 to maximize the intensity indicated by a detection signal from the detector 206.

The interferometer 210 corresponds to a decoder that receives the signal pulses 152 and 153 from the beam splitter 204 and decodes information from these signal pulses 152 and 153. The interferometer 210 is an asymmetric Mach-Zehnder interferometer.

In the interferometer 210, the signal pulses 152 and 153 enter the optical switch 212. The optical switch 212 separates the signal pulses 152 and 153 from each other and guides the signal pulse 153 to a path 231 and the signal pulse 152 to a path 232. In the present embodiment, the optical switch 212 includes a fast polarization controller 214 and a polarizing beam splitter 216 provided in a stage after the fast polarization controller 214. The fast polarization controller 214 controls polarization of one of the signal pulses 152 and 153. For example, the fast polarization controller 214 rotates polarization of the signal pulse 152 by 90 degrees while allowing the signal pulse 153 to pass as it is. In this manner, at an exit of the fast polarization controller 214, polarization of the signal pulse 152 is perpendicular to polarization of the signal pulse 153, and the signal pulse 152 is separated from the signal pulse 153 by the polarizing beam splitter 216.

The signal pulse 153 that travels along the path 231 enters the modulator 218. The modulator 218 modulates a phase of the signal pulse 153. The signal pulse 153 that has passed through the modulator 218 enters the beam combiner 222. The signal pulse 152 that travels along the path 232 also enters the beam combiner 222. The beam combiner 222 combines the signal pulse 152 and the signal pulse 153 that has passed through the modulator 218. The beam combiner 222 may be a fiber coupler, but is not limited thereto.

The path 232 from the optical switch 212 to the beam combiner 222 is longer in optical path length than the path 231 from the optical switch 212 to the beam combiner 222. The paths 231 and 232 are designed in a manner such that a difference in optical path length therebetween corresponds to a light propagation delay time $t_{delay}$. That is, a difference in optical path length in the interferometer 106 within the transmitter 100 is equal to a difference in optical path length in the interferometer 210 within the receiver 200. For this reason, ideally, the signal pulses 152 and 153 simultaneously enter the beam combiner 222, and interfere with each other within the beam combiner 222. A photon output from the beam combiner 222 is detected by the detector 224 or 226. The detectors 224 and 226 are single-photon detectors such as an avalanche photodiode.

As described above, non-ideal polarization may cause part of the polarization control pulse 154 to enter the interferometer 210. Therefore, in order not to detect this part of the polarization control pulse 154, which has entered the interferometer 210, that is, in order to selectively detect an interfered optical pulse, it is desirable that the detectors 224 and 226 be gated. Examples of a gated single-photon detector include a self-differencing avalanche photodiode, a sine-wave gated avalanche photodiode, etc. In order to prevent the detector 224 or 226 from detecting the polarization control pulse 154 that has entered the interferometer 210, it is desirable that the polarization control pulse 154 be positioned substantially in the middle of the signal pulse 152 and the signal pulse 153 in the optical pulse train 155.

In order to correct phase disturbance in the signal pulses 152 and 153, the control circuit 228 controls the delay line 220 based on detection results by the detectors 224 and 226. The delay line 220 may be a fiber stretcher, but is not limited thereto. The control circuit 228 adjusts the optical path length of the path 232 using the delay line 220. The control circuit 228 is realized by a dedicated hardware processor such as a FPGA. The control circuit 228 may be realized by a general hardware processor.

The delay line 220 may be provided in the path 231. The delay line 220 may be provided in the path 131 or 132 of the interferometer 106 within the transmitter 100. Correction of phase disturbance may be achieved by adjusting the optical path length of a path using the modulator 218 within the receiver 200 or the modulator 110 within the transmitter 100. In such a case, the delay line 220 may not be provided.

The polarization controller 202 may be provided within the transmitter 100. For example, the polarization controller 202 may be provided in a stage after the beam combiner 116 or the attenuator 118. In such a case, detection signal obtained by the detector 206 within the receiver 200 is transmitted to the transmitter 100 through a classical channel, and based on the detection signal, the control circuit within the transmitter 100 controls the polarization controller 202. The polarization controller 202 may be provided midway along the transmission path 190.

Described next is an example of a method for generating an encryption key in a quantum key distribution system according to the present embodiment.

The modulator 110 within the transmitter 100 randomly selects one of two encoding bases for each signal pulse 152, and modulates a phase of the signal pulse 152 using the selected encoding basis. A first encoding basis is defined in a manner such that information of "0" corresponds to phase shift of 0 degrees, and information of "1" corresponds to phase shift of 180 degrees. In the case where the first encoding basis is selected, the modulator 110 applies the phase shift of 0 degrees to the signal pulse 152 in order to encode the information of "0". The modulator 110 applies the phase shift of 180 degrees to the signal pulse 152 in order to encode the information of "1". A second encoding basis is defined in a manner such that information of "0" corresponds to phase shift of 90 degrees, and information of "1" corresponds to phase shift of 270 degrees. In the case where the second encoding basis is selected, the modulator 110 applies the phase shift of 90 degrees to the signal pulse 152 in order to encode the information of "0". The modulator 110 applies the phase shift of 270 degrees to the signal pulse 152 in order to encode the information of "1".

On the other hand, the modulator 218 within the receiver 200 randomly selects one of two decoding bases for each signal pulse, and modulates a phase of a signal pulse using the selected decoding basis. A first decoding basis is defined as phase shift of 0 degrees. In the case where the first decoding basis is selected, the modulator 218 applies the phase shift of 0 degrees to a signal pulse. A second decoding basis is defined as phase shift of 90 degrees. In the case where the second decoding basis is selected, the modulator 218 applies the phase shift of 90 degrees to a signal pulse.

In the case where polarization of the signal pulses 152 and 153 is ideal, the signal pulse 152 travels through a route explained in the item (1) below, while the signal pulse 153 travels through a route explained in the item (2) below.

(1) Route along the path 131 having the shorter optical path length in the interferometer 106 within the transmitter 100 and the path 232 having the longer optical path length in the interferometer 210 within the receiver 200.

(2) Route along the path 132 having the longer optical path length in the interferometer 106 within the transmitter 100 and the path 231 having the shorter optical path length in the interferometer 210 within the receiver 200.

In this case, the signal pulses 152 and 153 interfere with each other at the beam combiner 222, and one of the detectors 224 and 226 detects a photon. In the case where the detector 224 detects a photon, the interferometer 210 obtains information of "0". In the case where the detector 224 detects a photons the interferometer 201 obtains information of "1". Which detector detects a photon depends on which phase shift is applied by the modulator 110 and which phase shift is applied by the modulator 218. In the case where the modulator 110 and the modulator 218 apply the phase shift of 0 degrees and the phase shift of 0 degrees, respectively, the detector 224 detects a photon. In the case where the modulator 110 and the modulator 218 apply the phase shift of 180 degrees and the phase shift of 0 degrees, respectively, the detector 226 detects a photon. In the case where the modulator 110 and the modulator 218 apply the phase shift of 90 degrees and the phase shift of 90 degrees, respectively, the detector 224 detects a photon. In the case where the modulator 110 and the modulator 218 apply the phase shift of 270 degrees and the phase shift of 90 degrees, respectively, the detector 226 detects a photon. Those combinations correspond to the case where the transmitter 100 and the receiver 200 use the same modulation basis.

In the case where modulation is performed using a combination other than those described above, the probability that the detector 224 detects a photon and the probability that the detector 226 detects a photon are even, i.e., 50 percent and 50 percent, respectively. For example, in the case where the modulator 110 and the modulator 218 apply the phase shift of 0 degrees and the phase shift of 90 degrees, respectively, the detector 224 detects a photon with the probability of 50 percent, while the detector 226 detects a photon with the probability of 50 percent. In such a case, information cannot be decoded correctly, so that detected photons do not contribute to generation of the encryption key.

Non-ideal polarization may cause the signal pulse 152 that has traveled through the shorter path 131 to travel through the shorter path 231, and may cause the signal pulse 153 that has traveled through the longer path 132 to travel through the longer path 232. In such a case, the signal pulses 152 and 153 reach the detector 224 or 226 without interfering with each other. Those photons with no interference do not contribute to generation of an encryption key, so that detection results of those photons are discarded. In the case where the detectors 224 and 226 are gated, the detectors 224 and 226 can automatically eliminate those photons with no interference. In order to effectively eliminate phones with no interference, the delay time $t_{delay}$ is set to be a half of a gate operation cycle. For gate operation of 1 GHz, the delay time $t_{delay}$ is 500 picoseconds.

The transmitter 100 periodically transmits the optical pulse train 155, by which the receiver 200 obtains many interference detection results. Thereafter, a second classical channel device that is used together with the receiver 200 receives basis information indicative of an encoding basis selected for each optical pulse, from a first classical communication device that is used together with the transmitter 100. The basis information is transmitted on a classical channel. The control circuit 228 of the receiver 200 couples information that is obtained when selecting a decoding basis that matches an encoding basis selected by the transmitter 100. By using this coupled information, the control circuit 228 generates a bit string (shift key). Similarly, basis information is transmitted from the first classical communication device to the second classical communication device, and a shift key is generated in the transmitter 100. Thereafter, an error correction process and a confidentiality amplification process are performed, and an encryption key shared by the transmitter 100 and the receiver 200 is generated.

Next, examples of a method for correcting polarization disturbance and phase disturbance are described.

Polarization disturbance and phase disturbance need to be actively stabilized. In the present embodiment, polarization disturbance is corrected by actively adjusting the polarization controller 202 based on a detection result by the detector 206, while phase disturbance is corrected by actively adjusting the delay line 220 based on detection results by the detectors 224 and 226.

The transmitter 100 generates the polarization control pulse 154 for correcting polarization disturbance, and outputs the generated polarization control pulse 154 along with the signal pulses 152 and 153 to the transmission path 190. In the receiver 200, the polarization control pulse 154 is controlled in terms of polarization by the polarization controller 202, and a light component of the polarization control pulse 154, which has predetermined polarization, is guided by the beam splitter 204 to the detector 206. The light intensity of the polarization control pulse 154 is measured by the detector 206, and the control circuit 208 adjusts the polarization controller 202 such that the light intensity of the polarization control pulse 154 that is measured by the detector 206 is maximized. When the polarization controller 202 is adjusted such that the light intensity of the polarization control pulse 154 that is measured by the detector 206 is maximized, polarization of the polarization control pulse 154 that has passed through the polarization controller 202 becomes identical to predetermined polarization, that is, polarization disturbance is corrected appropriately.

Polarization disturbance caused in the signal pulses 152 and 153 is substantially identical to polarization disturbance caused in the polarization control pulse 154. Therefore, the polarization controller 202 that has been adjusted as described above can correct polarization disturbance in the signals 152 and 153 as appropriate. Polarization disturbance is corrected by feedback control as described above.

The control circuit 228 adjusts the delay line 220 based on a feedback signal that is generated based on detection results by the detectors 224 and 226. For example, the feedback signal indicates a quantum bit error rate (QBER). The quantum bit error rate is defined as a rate of error bits to total bits included in a shift key. The quantum bit error rate is calculated after the error correction. Phase disturbance increases the quantum bit error rate. The control circuit 228 adjusts the delay line 220 such that the quantum bit error rate is minimized. Phase disturbance is corrected appropriately by feedback control as described above.

Figure 3:
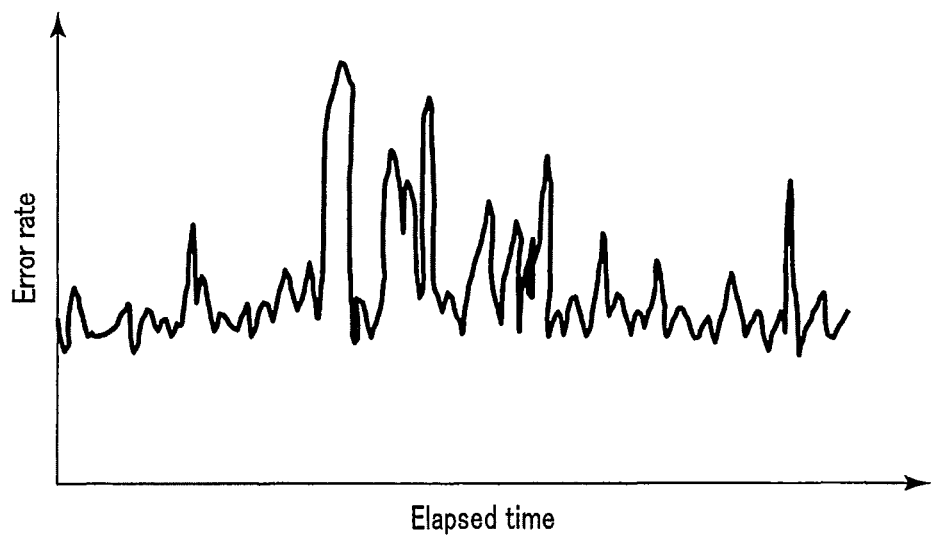
FIG. 3 is a diagram schematically illustrating a change over time of a quantum bit error rate in an existing quantum key distribution system.

FIG. 3 schematically illustrates a change over time of the quantum bit error rate in an existing quantum key distribution system in which a polarization control pulse is not used. In the existing quantum key distribution system, both of polarization disturbance and phase disturbance are corrected by an interference measurement result obtained by a detector (corresponding to the detectors 224 and 226 in the present embodiment). As shown in FIG. 3, the existing quantum key distribution system has a large variation in the quantum bit error rate. In the case of a large quantum bit error rate, the speed of generating an encryption key is decreased.

Figure 4:
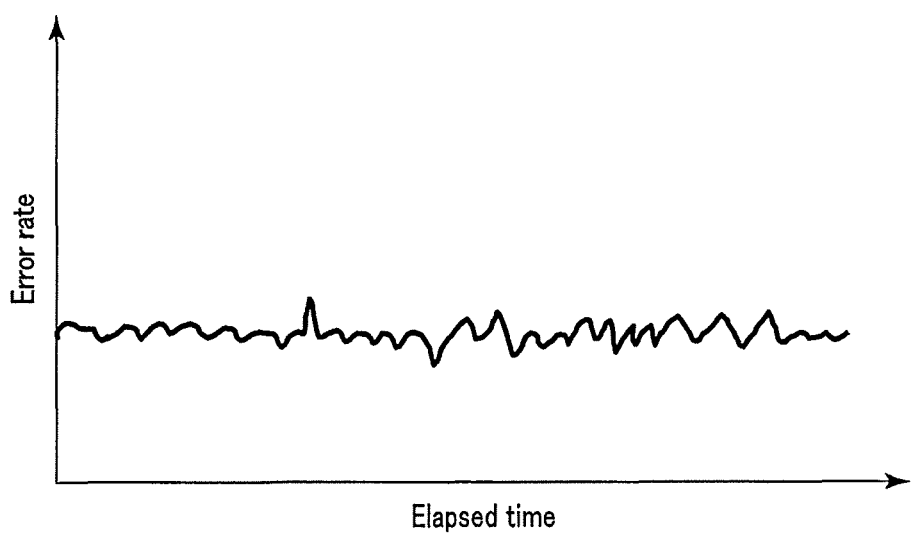
FIG. 4 is a diagram schematically illustrating a change over time of a quantum bit error rate in an existing quantum key distribution system in a situation free from polarization disturbance.

FIG. 4 schematically illustrates a change over time of the quantum bit error rate in the existing quantum key distribution system in a situation free from polarization disturbance. Herein, the vertical axis and the horizontal axis of FIG. 4 are identical in scale to those of FIG. 3. As shown in FIG. 4, in the case where only phase disturbance is corrected, the quantum bit error rate shows a small variation and remains low.

An interference measurement result depends on both of polarization disturbance and phase disturbance. Therefore, the existing quantum key distribution system requires simultaneous control over polarization and phase, which results in complicated control. In contrast, the quantum key distribution system according to the present embodiment, polarization disturbance and phase disturbance are corrected with different parameters, respectively. Polarization disturbance is corrected based on a detection result of the polarization control pulse 154, not an interference measurement result. That is, correction of polarization disturbance is not affected by phase disturbance. In this manner, polarization disturbance can be corrected with efficiency. When correction of polarization disturbance becomes highly efficient, phase disturbance can also be corrected with high efficiency, so that the improved quantum bit error rate such as shown in FIG. 4 is expected.

As described above, in the present embodiment, the transmitter 100 branches an optical pulse emitted from the light source 102, into two parts. One of those two branched parts of the optical pulse is used as the signal pulse 151 having encryption information, while the other of those two branched parts of the optical pulse is used as the polarization control pulse 154 for correcting polarization disturbance. This makes it possible to control polarization disturbance and phase disturbance separately. Polarization disturbance is controlled in accordance with a polarization state of the polarization control pulse 154. Thus, phase disturbance does not affect control of polarization disturbance. Therefore, polarization disturbance can be corrected with efficiency.

In the present embodiment, furthermore, the polarization control pulse 154 is in a multi-photon state when it is transmitted from the transmitter 100. This enables polarization disturbance to be controlled based on the light intensity that is measured by the detector 206, thereby making it possible to perform adjustment with respect to the polarization controller 202 each time the polarization control pulse 154 is received. As a result, polarization disturbance can be controlled with efficiency.

In another embodiment, the polarization control pulse 154 may be in a single-photon state when it is transmitted from the transmitter 100. The polarization control pulse 154 can be prevented or restrained from interfering with the signal pulses 152 and 153 by decreasing the intensity of the polarization control pulse 154. In such a case, a single-photon detector such as an avalanche photodiode can be used as the detector 206. Due to non-ideal polarization, a signal pulse may be guided to the detector 206. Therefore, it is preferable to use a single-photon detector that is gated, such as a self-differencing avalanche photodiode, a sine-wave gated avalanche photodiode, etc. The control circuit 208 monitors the number of polarization control pulses 154 (photons) which are detected per unit time by the detector 206. A unit time is sufficiently longer than a time interval for emission of an optical pulse from the light source 102. In the case where a time interval for emission of an optical pulse is 1 nanosecond, for example, a unit time is 20 nanoseconds. In this case, the polarization controller 202 is adjusted at intervals of unit time. Therefore, from the viewpoint of efficient control, it is desirable that the polarization control pulse be in a multi-photon state.

In the present embodiment, furthermore, the signal pulse 151 is branched into two pulses, i.e., the signal pulses 152 and 153, which are output with their polarization directions being aligned. In this case, substantially the same phase disturbance occurs in the signal pulse 152 and the signal pulse 153 in transmission. Therefore, this case causes relatively small phase disturbance and facilitates control of phase disturbance as compared with the case in which the polarization of the two signal pulses, i.e., polarization of the signal pulse 152 and polarization of the signal pulse 153, are perpendicular to each other.

Furthermore, in the present embodiment, the polarization control pulse 154 is output in a state in which the polarization direction of the polarization control pulse 154 is perpendicular to the polarization direction of the signal pulses 152 and 153. In this manner, the polarization control pulse 154 can be prevented or restrained from interfering with the signal pulses 152 and 153. Furthermore, the polarization control pulse 154 can be easily separated from the signal pulses 152 and 153 by an optical element such as a polarizing beam splitter.

In another embodiment, the polarization control pulse 154 may be output in a state in which the polarization direction of the control pulse 154 is the same as the polarization direction of the signal pulses 152 and 153. In this case, the beam splitter 204 within the receiver 200 includes, for example, a fast polarization controller, and a polarizing beam splitter or a polarizer, which is provided in a stage after the fast polarization controller. The fast polarization controller selectively controls polarization of the polarization control pulse 154 or polarization of the signal pulses 152 and 153. For example, the fast polarization controller rotates polarization of the signal pulse 154 by 90 degrees while allowing the signal pulses 152 and 153 to pass as they are. Such a fast polarization controller is not required in the present embodiment in which the polarization direction of the polarization control pulse 154 is perpendicular to the polarization direction of the signal pulses 152 and 153, so that the configuration of the beam splitter 204 can be simplified. Furthermore, as described above, the polarization control pulse 154 can be prevented or restrained from interfering with the signal pulses 152 and 153.

Described in the above embodiments is the quantum key distribution system based on the quantum key distribution scheme called "BB84". The above method for correcting polarization disturbance and phase disturbance is applicable to other quantum key distribution schemes such as, for example, differential phase shift quantum key delivery (DPS-QKD). In the differential phase shift quantum key delivery, an encoder is a phase modulator that modulates a phase of a signal pulse based on information to be transmitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transmitting device for a quantum key distribution system, the transmitting device comprising:
a light source configured to generate an optical pulse;
a first beam splitter configured to split the optical pulse into a signal pulse that travels through a first path and a polarization control pulse that travels through a second path, the second path being different in an optical path length from the first path;
an encoder provided at the first path; the encoder being configured to encode information with respect to the signal pulse; and
a first beam combiner configured to combine the signal pulse passing through the encoder and the polarization control pulse,
wherein the encoder is an interferometer comprising:
a second beam splitter configured to split the signal pulse into a first signal pulse that travels through a third path and a second signal pulse that travels through a fourth path, the fourth path being different in an optical path length from the third path;
a modulator configured to modulate a phase of the first signal pulse based on the information; and
a second beam combiner configured to combine the first signal pulse passing through the modulator and the second signal pulse; and
polarization of the first signal pulse is identical to polarization of the second signal pulse at an exit of the second beam combiner.

2. The transmitting device according to claim 1, wherein the polarization control pulse is in a multi-photon state when the polarization control pulse is transmitted from the transmitting device.

3. The transmitting device according to claim 1, wherein polarization of the polarization control pulse is perpendicular to polarization of the signal pulse at an exit of the first beam combiner.

4. A receiving device for a quantum key distribution system, the receiving device comprising:
a polarization controller configured to control polarization of an optical pulse train, the optical pulse train including a signal pulse and a polarization control pulse;
a beam splitter configured to receive the optical pulse train passing through the polarization controller, and to split the optical pulse train into the signal pulse and the polarization control pulse;
a detector configured to detect the polarization control pulse output from the beam splitter, and to output a detection result to adjust the polarization controller;
an interferometer configured to decode information from the signal pulse output from the beam splitter; and
a control circuit configured to adjust the polarization controller based on the detection result such that the polarization control pulse within the optical pulse train entering the beam splitter has predetermined polarization;
wherein:
the beam splitter includes an optical element configured to extract a light component having the predetermined polarization from the polarization control pulse within the optical pulse train entering the beam splitter, and
the control circuit adjusts the polarization controller to maximize an intensity of the polarization control pulse that is measured by the detector.

5. The receiving device according to claim 4, wherein:
the optical pulse train is transmitted from a transmitting device in a state where polarization of the polarization control pulse is perpendicular to polarization of the signal pulse; and
the beam splitter is a polarizing beam splitter.

6. A receiving device for a quantum key distribution system, the receiving device comprising:
a polarization controller configured to control polarization of an optical pulse train, the optical pulse train including a signal pulse and a polarization control pulse;
a beam splitter configured to receive the optical pulse train passing through the polarization controller, and to split the optical pulse train into the signal pulse and the polarization control pulse;

a detector configured to detect the polarization control pulse output from the beam splitter, and to output a detection result to adjust the polarization controller;

an interferometer configured to decode information from the signal pulse output from the beam splitter; and a control circuit configured to adjust the polarization controller based on the detection result such that the polarization control pulse within the optical pulse train enterin the beam splitter has predetermined polarization;

wherein:

the beam splitter includes an optical element configured to extract a light component having the predetermined polarization from the polarization control pulse within the optical pulse train entering the beam splitter; and the control circuit adjusts the polarization controller to maximize the number of polarization control pulses that are detected per unit time by the detector.

\* \* \* \* \*